United States Patent
Ababi (10) Patent No.: US 11,864,694 B2
(45) Date of Patent: Jan. 9, 2024

(54) SKEWER COMBINED WITH A SLIDABLE PUSH BAR FOR EASILY REMOVING COOKED FOOD FROM THE SKEWER

(71) Applicant: Andrei Ababi, Chicago, IL (US)

(72) Inventor: Andrei Ababi, Chicago, IL (US)

(*) Notice: Subject to any disclaimer, the term of this patent is extended or adjusted under 35 U.S.C. 154(b) by 718 days.

(21) Appl. No.: 16/949,391

(22) Filed: Oct. 28, 2020

(65) Prior Publication Data
US 2021/0353106 A1     Nov. 18, 2021

Related U.S. Application Data

(60) Provisional application No. 62/704,469, filed on May 12, 2019.

(51) Int. Cl.
*A47J 43/18*     (2006.01)

(52) U.S. Cl.
CPC .................... *A47J 43/18* (2013.01)

(58) Field of Classification Search
CPC ........... A47J 43/18; A47J 43/28; A47J 43/283
USPC ............................... 294/61, 14, 26
See application file for complete search history.

(56) References Cited

U.S. PATENT DOCUMENTS

| | | | | |
|---|---|---|---|---|
| 2,488,362 A | * | 11/1949 | Wiur | E04C 3/06 294/61 |
| 2,935,013 A | | 5/1960 | Onori | |
| 3,217,635 A | * | 11/1965 | Scavullo | A47J 43/283 294/61 |
| 4,176,592 A | * | 12/1979 | Doyle, Jr. | A47J 37/0694 99/421 A |
| 4,728,139 A | * | 3/1988 | Oretti | A47J 43/283 294/99.2 |
| 4,768,288 A | * | 9/1988 | Culbertson | A47G 21/02 294/25 |
| 5,193,443 A | | 3/1993 | Carney | |
| 6,286,418 B1 | | 9/2001 | Berke et al. | |
| 6,959,496 B2 | | 11/2005 | Wilkinson, Jr. et al. | |
| D513,573 S | * | 1/2006 | Settele | D7/683 |
| 7,104,577 B1 | | 9/2006 | Berke | |
| 7,118,146 B2 | | 10/2006 | Settele | |
| 8,973,194 B1 | | 3/2015 | Caughey et al. | |
| D813,619 S | * | 3/2018 | Cloutier | D7/683 |
| 9,993,109 B2 | | 6/2018 | Brown | |
| D876,181 S | * | 2/2020 | Cloutier | D7/683 |
| 2004/0143971 A1 | | 7/2004 | Barcala | |

(Continued)

*Primary Examiner* — Paul T Chin
(74) *Attorney, Agent, or Firm* — Dunlap Bennett & Ludwig, PLLC (57) ABSTRACT

A self-locking slider for a skewer. The self-locking slider has an engaged end and an opposing push end. The self-locking slider has spaced apart first and second plates to engage an engaged end of the skewer biasedly in a locked engagement, yet the first and second plates are movable to an unlocked engagement. The first plate defines a locking aperture at the engaged end for slidably receiving the skewer in a longitudinal direction and, separately, in a latitudinal direction between a locking end and an unlocking end of the locking aperture. The second plate at the engaged end and the push end provide aligned skewer passageways, respectively, for slidably receiving the skewer in the longitudinal direction. The first and second plates are movable toward each other to the unlocked engagement enabling the self-locking slider to slide along a length of a skewer by way of the skewer passageways.

15 Claims, 8 Drawing Sheets

(56) References Cited

U.S. PATENT DOCUMENTS

| | | | |
|---|---|---|---|
| 2007/0079709 A1* | 4/2007 | Giblin | A47J 43/18 99/419 |
| 2009/0211936 A1 | 8/2009 | Korff | |
| 2012/0119527 A1 | 5/2012 | Deitemeyer et al. | |
| 2014/0070475 A1 | 3/2014 | Ghazizadeh | |
| 2019/0307293 A1 | 10/2019 | Kalic | |

* cited by examiner

SKEWER COMBINED WITH A SLIDABLE PUSH BAR FOR EASILY REMOVING COOKED FOOD FROM THE SKEWER

CROSS-REFERENCE TO RELATED APPLICATION

This application claims the benefit of priority of U.S. provisional application No. 62/704,469, filed 12 May 2020, the contents of which are herein incorporated by reference.

BACKGROUND OF THE INVENTION

The present invention relates to cooking implements and, more particularly, a skewer combined with a push bar for easily removing cooked food from the skewer.

With regular skewers, it is difficult to cleanly remove the food from the skewer, generally, and painful when removing cooked food from the skewer by hand when there is no other implement handy.

As can be seen, there is a need for a skewer combined with a push bar for safely urging cooked food from the skewer. The present invention has a built-in push slider for selectively urging the cooked food easily and cleanly off the skewer without using extraneous tools or one's fingers.

SUMMARY OF THE INVENTION

In one aspect of the present invention, the self-locking slider for a skewer, a self-locking slider provides the following: a first plate and a second plate, both plates extending from a push end to an engaged end, and both plates biased to be spaced apart; two skewer passageways in an aligned orientation, one of the two skewer passageways in the engaged end of the second plate and one of the two skewer passageways in the push end; a locking aperture in the engaged end of the first plate; and the first plate and the second plate are biased in a spaced apart orientation in such a way that the locking aperture and the skewer passageway in the engaged end of the second plate are mutually exclusive, wherein the first plate is movable so that the locking aperture and the skewer passageway in the engaged end of the second plate are mutually inclusive.

In another aspect of the present invention, the self-locking slider for a food skewer, the self-locking slider includes the following: a first plate and a second plate, both plates extending from a push end to an engaged end, and both plates biased to be spaced apart; two skewer passageways in an aligned orientation, one of the two skewer passageways in the engaged end of the second plate and one of the two skewer passageways in the push end; a locking aperture in the engaged end of the first plate; and the first plate and the second plate are biased in a spaced apart orientation in such a way that the locking aperture and the skewer passageway in the engaged end of the second plate are mutually inclusive by less than a distance defined by a thickness of the food skewer, wherein the first plate is movable so that the locking aperture and the skewer passageway in the engaged end of the second plate are mutually inclusive by equal to or greater than said distance.

In yet another embodiment of the present invention a slider combined with a food skewer provides the following: the slider having: a first plate and a second plate, both plates extending from a push end to an engaged end, and both plates biased to be spaced apart; two skewer passageways in an aligned orientation, one of the two skewer passageways in the engaged end of the second plate and one of the two skewer passageways in the push end; a locking aperture in the engaged end of the first plate; and the first plate and the second plate are biased in a spaced apart orientation; and the food skewer slid through the two skewer passageways and the locking aperture, wherein the spaced apart orientation urges a locked engagement between the food skewer and the locking aperture, wherein the locking aperture is movable between the locked engagement and an unlocked engagement enabling the slider to slide along a length of the food skewer, wherein the locking aperture is movable to the unlocked engagement by moving the first plate toward the second plate, wherein the push end is a U-shape, the two legs of the U-shape are joined to the first plate and the second plate in such a way to urge the spaced apart orientation, wherein the locking aperture extends from a locking end and an unlocking end, and wherein the locking end engages the food skewer in the locked engagement, wherein the engaged end is defined by the first plate overlapping the second plate, and wherein the push end is defined by the first plate joined to the second plate at a turn.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a self-locking slider for a skewer. The self-locking slider has an engaged end and an opposing push end. The self-locking slider has two spaced apart plates that are adapted to engage a skewer at the engaged end. The two plates include a first plate and a second plate. The first plate defines a locking aperture at the engaged end for slidably receiving the skewer in a longitudinal direction. The locking aperture extends between locking end and an unlocking end, the locking aperture is dimensioned and adapted so that locking aperture can move latitudinally relative to the skewer. The second plate at the engaged end and the push end provide aligned passageways, respectively, for slidably receiving the skewer in the longitudinal direction. The first and second plates are biased in a spaced apart orientation in such a way that a skewer through the locking aperture and the two passageways is in a locked engagement relative to the self-locking slider. The first and second plates are movable toward each other, which moves the self-locking slider to an unlocked engagement enabling the self-locking slider to slide along a length of a skewer, whereby the push end can urge food products skewered on the skewer along the length and off the skewer.

Referring now to FIGS. 1 through 12, the present invention may include a skewer 10 combined with a self-locking slider 20. The skewer 10 has a body that extends between a tip 12 to a handle 14. The tip 12 generally being adapted to pierce food for sliding along the length of the skewer body.

The self-locking slider 20 is movable between a locked engagement and an unlocked engagement with the skewer 10. In the unlocked engagement the self-locking slider 20 can slide between the handle 14 to the tip 12. The self-locking slider 20 is biased in the locked engagement. The self-locking slider 20 may be movable between the locked and unlocked engagement through urging opposing plates 21 and 22 in a toward each other, orthogonal to the longitudinal direction of the skewer body.

Figure 1:
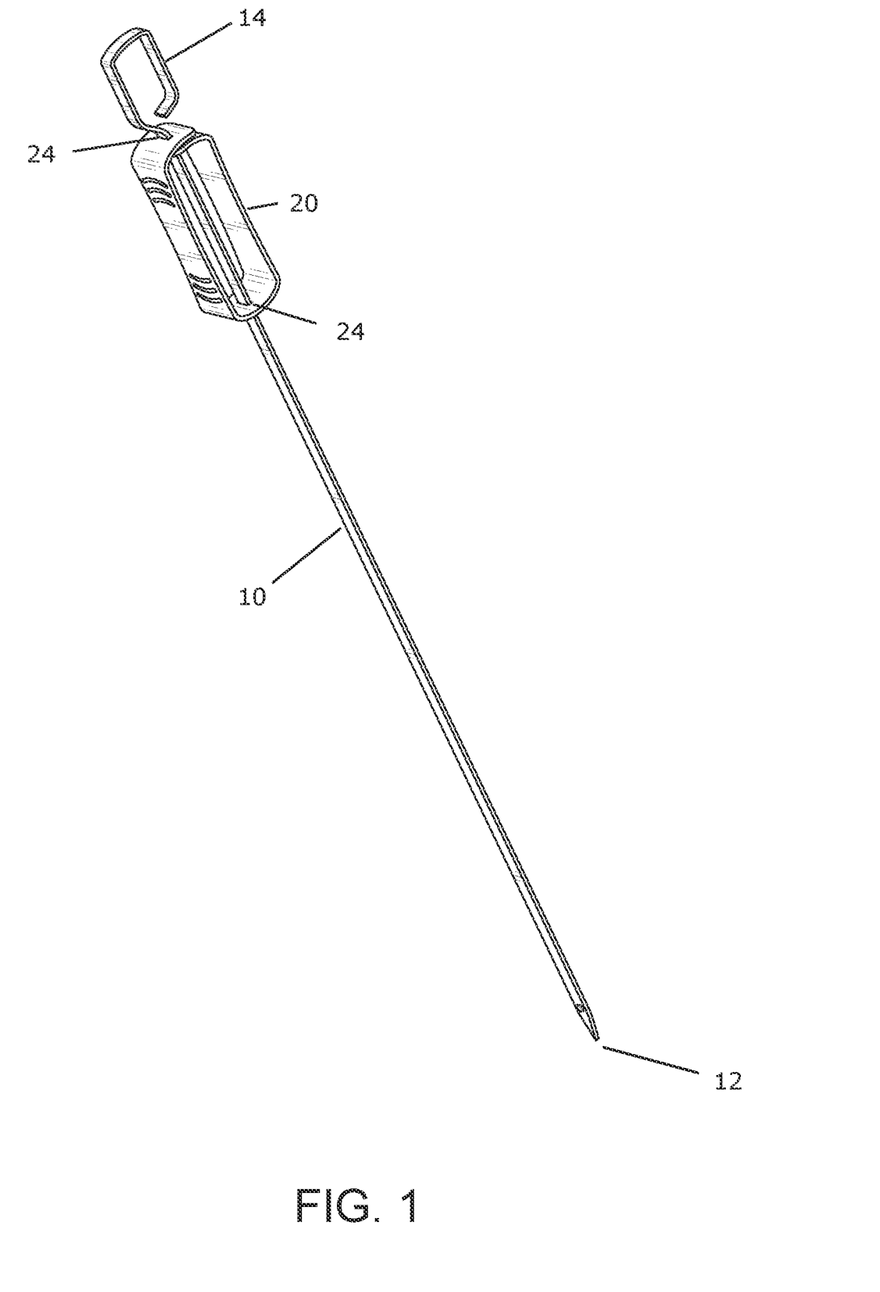
FIG. 1 is a perspective view of an exemplary embodiment of the present invention.
Figure 2:
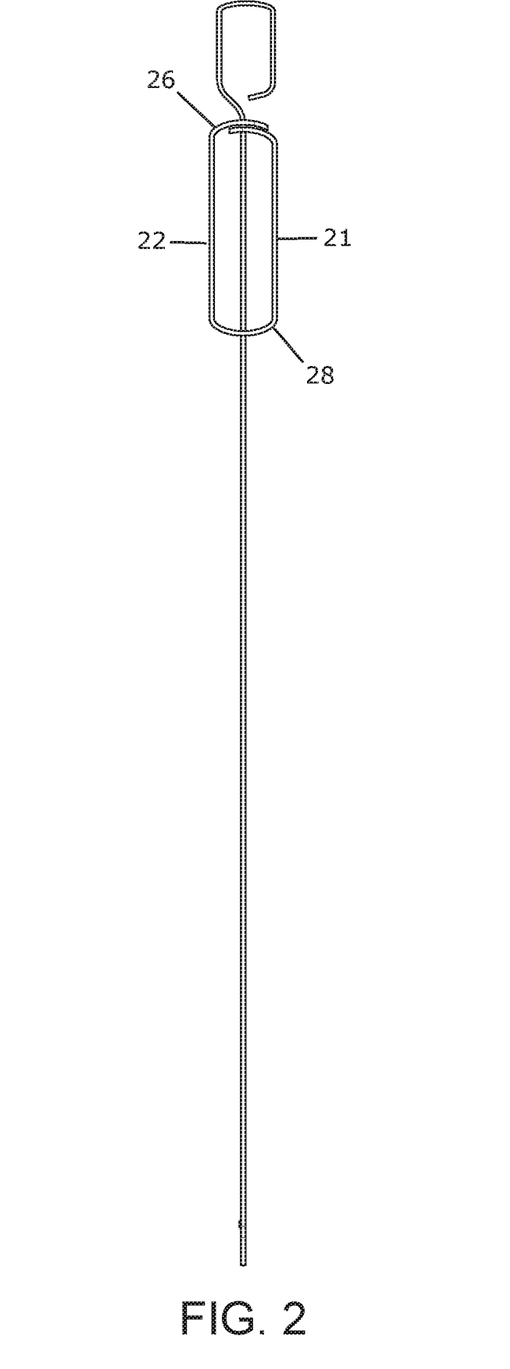
FIG. 2 is a left elevation view of an exemplary embodiment of the present invention.
Figure 3:
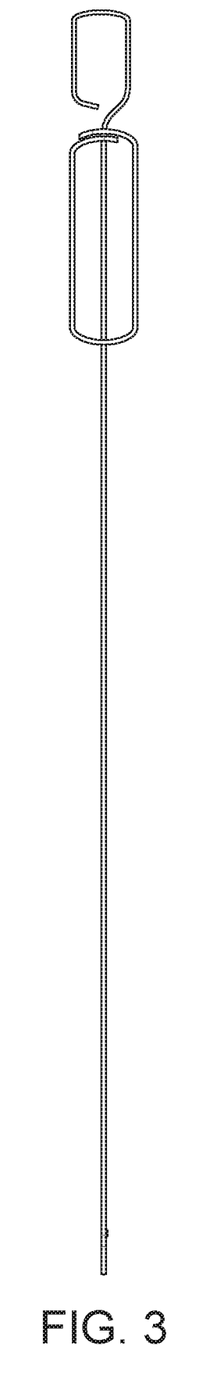
FIG. 3 is a right elevation view of an exemplary embodiment of the present invention.
Figure 4:
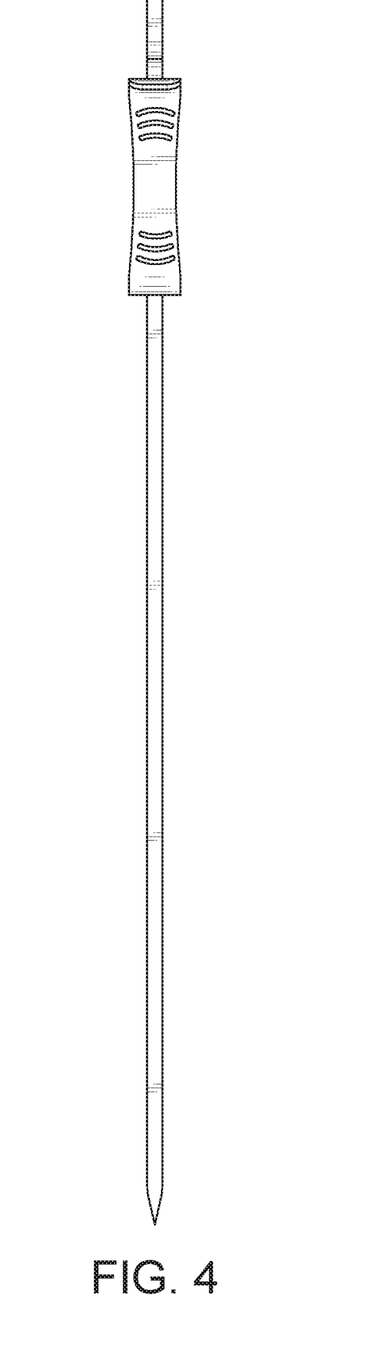
FIG. 4 is a bottom plan view of an exemplary embodiment of the present invention.
Figure 5:
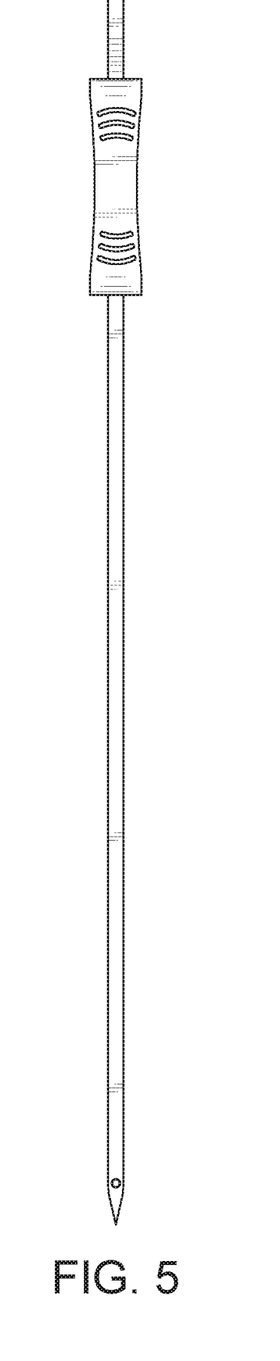
FIG. 5 is a top plan view of an exemplary embodiment of the present invention.
Figure 6:
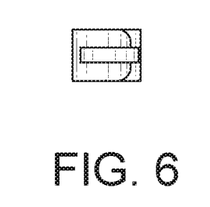
FIG. 6 is a rear elevation view of an exemplary embodiment of the present invention.
Figure 7:
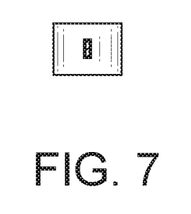
FIG. 7 is a front elevation view of an exemplary embodiment of the present invention.
Figure 8:
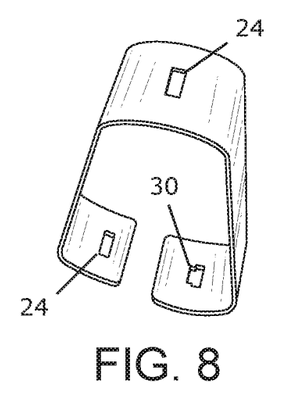
FIG. 8 is a top perspective view of an exemplary embodiment of a self-locking slider of the present invention.
Figure 9:
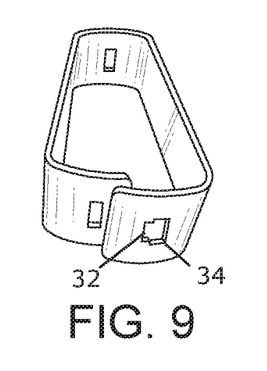
FIG. 9 is a bottom perspective view of an exemplary embodiment of the self-locking slider of the present invention.
Figure 10:
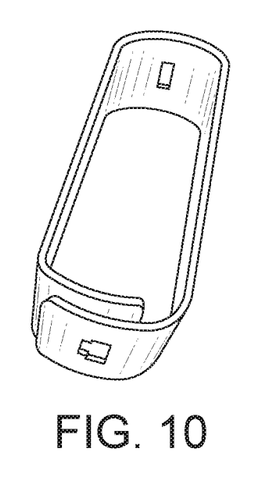
FIG. 10 is a perspective view of an exemplary embodiment of the self-locking slider of the present invention.
Figure 11:
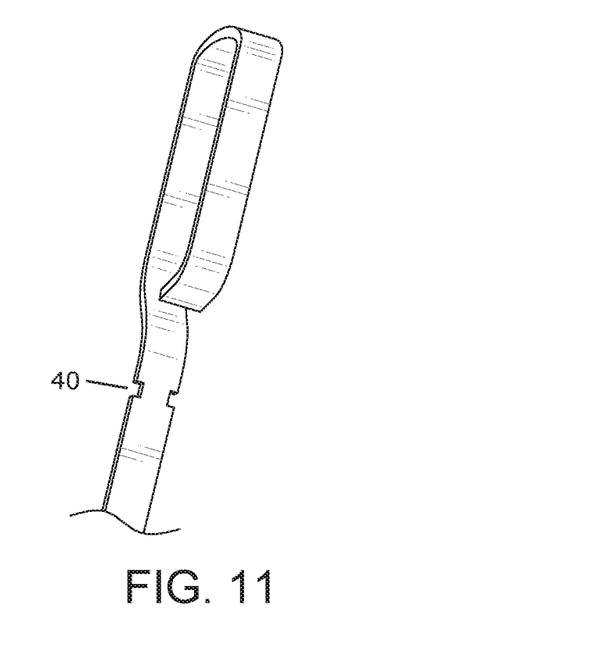
FIG. 11 is a detailed perspective view of an exemplary embodiment of a locking point of the present invention.
Figure 12:
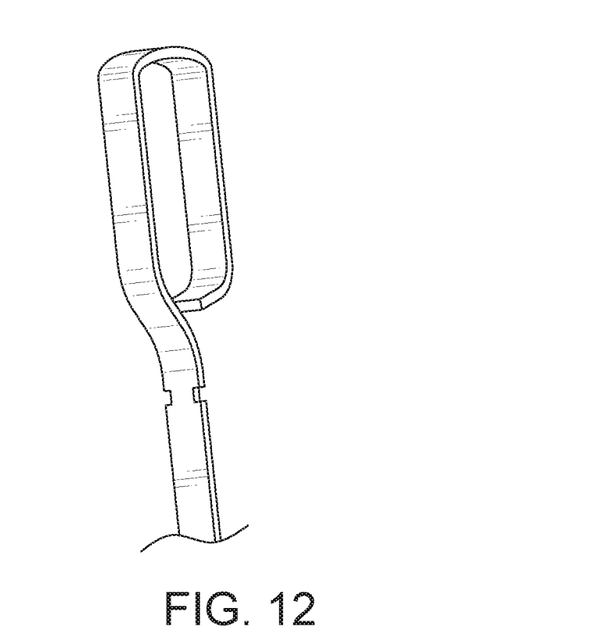
FIG. 12 is a perspective view of an exemplary embodiment of the locking point of the present invention.

In certain embodiments, the self-locking slider 20 provides two spaced apart plates 21, 22 that each separately engage the skewer body along distal ends of the plates 21 and 22. The two plates 21 and 22 may be attached or joined at a push end 28. The push end 28 may bias the two plates 21 and 22 to be spaced apart from each other, as illustrated in FIG. 8. In certain embodiments, the push end 28 may be a U-shaped element whose legs are joined to the distal ends of the two plates 21 and 22, respectively, and thus maintain the two plates 21 and 22 in at least a parallel orientation spaced apart by a predetermined distance defined by the 'width' of the U-shape element. Though, the biased orientation may have the spaced apart plates 21 and 22 directly away from each other, as illustrated in FIGS. 8 and 9.

The push end 28 and the proximal end of the second plate 22 may each, separately, provide aligning skewer passageways 24 dimensioned and adapted so that the skewer body is slidable through both aligned skewer passageways 24.

The distal end of the first plate 21 provides a locking aperture 30 through which slides the skewer body. The locking aperture 30 extends coaxially along the first plate 21—between a locking end 32 and a sliding end 34—for a distance substantially greater than the thickness of the skewer body. For example, if the skewer body has a thickness of one millimeter, the length of the locking aperture may be two or more millimeters. In some embodiments, each end 32 and 34 may have a thickness at least as thick as said thickness of the skewer body.

In the locked engagement, the push end 28 biases the first plate 21 so that the locking end 32 of the locking aperture 30 is urged against the skewer body, which in turn urges the skewer body against a wall of the skewer passageway 24 of the second plate 22. This pinches the skewer body against said wall of the skewer passageway 24 and the locking end 32, forming, in part, the locked engagement through the resulting pinching force and associated friction.

The two plates 21 and 22 are adapted to be moveable toward each other by the user, typically by pinching the two plates 21 and 22 between a user finger(s) and an opposing thumb, this moves the locking aperture relative to the skewer body (i.e., the skewer body moves towards the unlocking end) so that the locking end 32 is no longer urging the skewer body against said wall of the skewer passageway 24, enabling the unlocked engagement. Specifically, in the unlocked engagement, skewer body my occupy the slide end 34, facilitating manual sliding of the self-locking slider 20 relative to the skewer body.

In certain embodiments, the skewer body, just downward of the handle 14, provides opposing notches 40 that narrow the width of the skewer body at that locking point. Moreover, the locking end 32 may have a width substantially (ten to thirty) percent less than a width associated with the sliding end 34, whereby when the locking point occupies the locking end 32 the self-locking slider 20 cannot be moved longitudinally along the skewer body, further reinforcing the locked engagement.

In one embodiment, the two spaced apart plates 21 and 22 are parts of a unitary element that turns at the push end 28 folds over itself at the engaged end 26. The engaged end 26 and the push end 28 have skewer holes 24. In one embodiment, at the engaged end 26, each plate 21 and 22 has its own skewer hole 24 with the skewer 10 slid through both, so that the urging the two opposing plates 21 and 22 to be spaced apart causes the skewer body to be pinched between the opposing peripheries of the two skewer holes 24 at the engaged end 26, as well as potentially having the locking end 32 of the locking aperture 30 engaged with the locking point, both resulting in the locked engagement.

A method of using the present invention may include the following. A user may slide food stuff on the skewer 10 by way of its tip 12. Thereafter, when the user wants to remove said food stuff, the user urges the plates 21 and 22 toward each other—moving the slider 20 to the unlocked engagement—whereby the user can without making a mess, burning themselves, or using another tool slide the slider 20 down the length of the skewer 10, pushing the food stuff from the tip 12 by way of the push end 28.

It should be understood, of course, that the foregoing relates to exemplary embodiments of the invention and that modifications may be made without departing from the spirit and scope of the invention as set forth in the following claims.

What is claimed is:

1. A self-locking slider for a skewer, the self-locking slider comprising:
   a first plate and a second plate, both plates extending from a push end to an engaged end, and both plates biased to be spaced apart;
   two skewer passageways in an aligned orientation, one of the two skewer passageways in the engaged end of the second plate and one of the two skewer passageways in the push end;
   a locking aperture in the engaged end of the first plate; and
   the first plate and the second plate are biased in a spaced apart orientation in such a way that the locking aperture and the skewer passageway in the engaged end of the second plate are mutually exclusive,
   wherein the first plate is movable so that the locking aperture and the skewer passageway in the engaged end of the second plate are mutually inclusive.

2. The self-locking slider for a food skewer of claim 1, further comprising:
the locking aperture having a locking end communicating with a sliding end, wherein a length of the locking end is substantially less than a length of the sliding end.

3. A self-locking slider for a food skewer, the self-locking slider comprising:
a first plate and a second plate, both plates extending from a push end to an engaged end, and both plates biased to be spaced apart;
two skewer passageways in an aligned orientation, one of the two skewer passageways in the engaged end of the second plate and one of the two skewer passageways in the push end;
a locking aperture in the engaged end of the first plate; and
the first plate and the second plate are biased in a spaced apart orientation in such a way that the locking aperture and the skewer passageway in the engaged end of the second plate are mutually inclusive by less than a distance defined by a thickness of the food skewer,
wherein the first plate is movable so that the locking aperture and the skewer passageway in the engaged end of the second plate are mutually inclusive by equal to or greater than said distance.

4. The self-locking slider for a food skewer of claim 1, further comprising:
the locking aperture having a locking end communicating with a sliding end, wherein a length of the locking end is substantially less than a length of the sliding end.

5. A slider combined with a food skewer, comprising:
the slider comprising:
a first plate and a second plate, both plates extending from a push end to an engaged end, and both plates biased to be spaced apart;
two skewer passageways in an aligned orientation, one of the two skewer passageways in the engaged end of the second plate and one of the two skewer passageways in the push end;
a locking aperture in the engaged end of the first plate; and
the first plate and the second plate are biased in a spaced apart orientation; and
the food skewer slid through the two skewer passageways and the locking aperture, wherein the spaced apart orientation urges a locked engagement between the food skewer and the locking aperture.

6. The slider combined with the food skewer of claim 5, wherein the locking aperture is movable between the locked engagement and an unlocked engagement enabling the slider to slide along a length of the food skewer.

7. The slider combined with the food skewer of claim 6, wherein the locking aperture is movable to the unlocked engagement by moving the first plate toward the second plate.

8. The slider combined with the food skewer of claim 7, wherein the push end is a U-shape, the two legs of the U-shape are joined to the first plate and the second plate in such a way to urge the spaced apart orientation.

9. The slider combined with the food skewer of claim 8, wherein the locking aperture extends from a locking end and an unlocking end, and wherein the locking end engages the food skewer in the locked engagement.

10. The slider combined with the food skewer of claim 9, wherein the engaged end is defined by the first plate overlapping the second plate.

11. The slider combined with the food skewer of claim 10, wherein the push end is defined by the first plate joined to the second plate at a turn.

12. The slider combined with the food skewer of claim 11, wherein a length of the locking end is substantially less than a length of the sliding end.

13. The slider combined with the food skewer of claim 12, further comprising a locking point along the food skewer, wherein a width of the locking point is substantially less than a width of the food skewer.

14. The slider combined with the food skewer of claim 13, wherein the locking point is defined by two opposing notches.

15. The slider combined with the food skewer of claim 14, wherein the locking point and the locking end engage in the locked engagement.

* * * * *